United States Patent
Ohhashi

(10) Patent No.: US 9,167,131 B2
(45) Date of Patent: Oct. 20, 2015

(54) IMAGE RECORDING APPARATUS FOR MONITORING UNAUTHORIZED COPY JOBS

(71) Applicant: BROTHER KOGYO KABUSHIKI KAISHA, Nagoya, Achi-ken (JP)

(72) Inventor: Masashi Ohhashi, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 36 days.

(21) Appl. No.: 14/224,754

(22) Filed: Mar. 25, 2014

(65) Prior Publication Data

US 2015/0092207 A1     Apr. 2, 2015

(30) Foreign Application Priority Data

Sep. 30, 2013   (JP) ................................. 2013-205414

(51) Int. Cl.
*G06K 15/00*     (2006.01)
*H04N 1/44*     (2006.01)
*H04N 1/00*     (2006.01)

(52) U.S. Cl.
CPC ............. *H04N 1/444* (2013.01); *H04N 1/0057* (2013.01); *H04N 1/00408* (2013.01); *H04N 1/00814* (2013.01); *H04N 1/4413* (2013.01)

(58) Field of Classification Search
CPC ... H04N 1/444; H04N 1/4406; H04N 1/4413; H04N 1/4433
See application file for complete search history.

(56) References Cited

U.S. PATENT DOCUMENTS

2010/0253977 A1*   10/2010   Kunori .................... 358/1.15
2013/0057920 A1*   3/2013    Nagata .................... 358/1.16

FOREIGN PATENT DOCUMENTS

| JP | 2004-352429 A | 12/2004 |
| JP | 2006-133966 A | 5/2006  |
| JP | 2008-262407 A | 10/2008 |
| JP | 2009-134216 A | 6/2009  |

* cited by examiner

*Primary Examiner* — Benjamin O Dulaney
(74) *Attorney, Agent, or Firm* — Merchant & Gould PC

(57) ABSTRACT

An image recording apparatus includes a controller configured to: determine whether a change of a signal from a sensor indicates a case where a recording medium is conveyed by a conveyance mechanism or a case where the recording medium is placed on a placement unit without conveying by the conveyance mechanism, based on whether the recording medium is conveyed by the conveyance mechanism; start, when the reading unit is operated to start reading the image within a first predetermined time after the signal from the sensor is changed, monitoring to determine whether the recording medium is placed on the placement unit without conveying by the conveyance mechanism; and store, when it is determined during the monitoring that the recording medium is placed on the placement unit without conveying by the conveyance mechanism, data indicating an irregularity reading in the storage unit.

10 Claims, 4 Drawing Sheets

IMAGE RECORDING APPARATUS FOR MONITORING UNAUTHORIZED COPY JOBS

CROSS-REFERENCE TO RELATED APPLICATION

This application claims priority from Japanese Patent Application No. 2013-205414 filed on Sep. 30, 2013, the entire subject matter of which is incorporated herein by reference.

TECHNICAL FIELD

This disclosure relates to an image recording apparatus and a program, which is used to record an image on a recording medium.

BACKGROUND

In case that a plurality of terminals shares one printer, a time lag occurs from when a printing instruction is issued from the terminal to when a user moves to take a printed medium of the printer. During the time lag, another person takes out the printed medium, so that the information may leak out. In order to suppress this situation, there is a technology in which a mark indicating personal information of the user having issued the printing instruction is attached to the printed medium.

SUMMARY

However, in the case of a multifunction peripheral where a printer has copy and scanner functions, the other person can acquire the information by copy and scanning the printed medium on the site. In this case, since the printed medium remains at the printer, it is difficult for the user to perceive the information leakage.

This disclosure provides an image recording apparatus and a program capable of suppressing leakage of information recorded on a recording medium.

An image recording apparatus in one aspect of this disclosure includes: a reading unit configured to read an image formed on a recording medium; a recording unit configured to record an image on the recording medium positioned in a recording area; a placement unit, on which the recording medium having the image recorded by the recording unit is placed; a conveyance mechanism configured to convey the recording medium to the placement unit via the recording area; a sensor configured to output a signal, based on whether the recording medium on the placement unit is detected; a storage unit; and a controller configured to control the reading unit, the recording unit, the conveyance mechanism, the sensor and the storage unit. The controller is configured to: determine, when the signal received from the sensor is changed from a signal indicating that the recording medium is not detected to a signal indicating that the recording medium is detected, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism; start, when the reading unit is operated to start reading the image within a first predetermined time after the signal received from the sensor is changed from the signal indicating that the recording medium is detected to the signal indicating that the recording medium is not detected, monitoring to determine whether the recording medium is placed on the placement unit without conveying by the conveyance mechanism; and store, when it is determined during the monitoring that the recording medium is placed on the placement unit without conveying by the conveyance mechanism, data indicating an irregularity reading in the storage unit.

A non-transitory computer-readable medium of one aspect of this disclosure has instructions to control an image recording apparatus comprising a reading unit configured to read an image formed on a recording medium; a recording unit configured to record an image on the recording medium positioned in a recording area; a placement unit, on which the recording medium having the image recorded by the recording unit is placed; a conveyance mechanism configured to convey the recording medium to the placement unit via the recording area; a sensor configured to output a signal, based on whether the recording medium on the placement unit is detected; wherein the image recording apparatus is configured to determine, when the signal received from the sensor is changed from a signal indicating that the recording medium is not detected to a signal indicating that the recording medium is detected, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism. The instructions to control the image recording apparatus to perform a method comprise: starting, when the reading unit is operated to start reading the image within a first predetermined time after the signal received from the sensor is changed from the signal indicating that the recording medium is detected to the signal indicating that the recording medium is not detected, monitoring to determine whether the recording medium is placed on the placement unit without conveying by the conveyance mechanism; and storing, when it is determined during the monitoring that the recording medium is placed on the placement unit without conveying by the conveyance mechanism, data indicating an irregularity reading in the storage unit.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, an image recording apparatus according to an illustrative embodiment of this disclosure will be specifically described with reference to the accompanying drawings. In this illustrative embodiment, this disclosure is applied to a Multi Function Peripheral (MFP: Multi Functional Peripheral) having scanner and printing functions.

Figure 1:
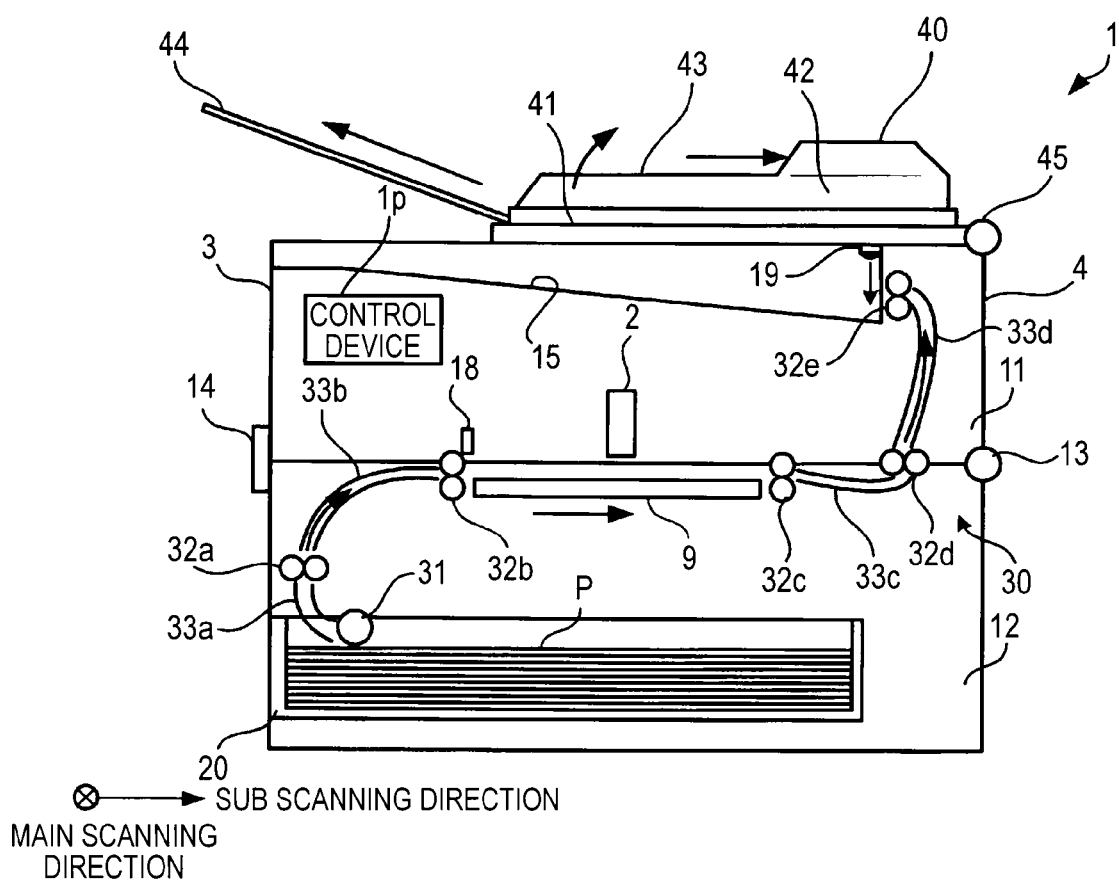
FIG. 1 is a schematic side view showing an interior of a Multi Function Peripheral (MFP) according to an illustrative embodiment of this disclosure.

As shown in FIG. 1, an MFP 1 has an upper housing 11 and a lower housing 12, which have a cuboid shape. In the meantime, a left side of FIG. 1 is a front side 3. A right side of FIG. 1 is a backside 4. The upper housing 11 has an open lower face and the lower housing 12 has an open upper face. The upper housing 11 is connected to the lower housing 12 so that it can rotate about a rotational shaft 13. An upper face of the upper housing 11 is provided with a placement unit 15. A sheet P, on which a printing operation is completed and is discharged, is sequentially placed on the placement unit 15. A sheet discharge sensor 19 is arranged at an upstream side of the placement unit 15 with respect to a discharge direction. The sheet discharge sensor 19 is a reflection-type sensor that outputs a signal, based on whether a sheet is placed on the placement unit 15 or not. The sheet discharge sensor 19 outputs an ON signal to a control device 1p in case that there is a sheet placed on the placement unit 15 and outputs an OFF signal to the control device 1p in case that there is no sheet on the placement unit.

Also, an inkjet head 2, a sheet tray 20, a conveyance mechanism 30 and a platen 9 are arranged in an internal space of the MFP 1.

A lower face of the inkjet head 2 is formed with a discharge face on which a plurality of nozzles through which ink droplets are discharged. The sheet tray 20 can hold a plurality of sheets P stacked therein and is detachably arranged on a bottom face of the lower housing 12. The platen 9 is a plate member for supporting the sheet and is fixed to the lower housing 12 so that it faces the discharge face of the inkjet head 2 when the upper housing 11 is located at a closed position.

The conveyance mechanism 30 configures a conveyance path of the sheet P, which is formed from the sheet tray 20 to the placement unit 15 via a position between the inkjet head 2 and the platen 9. The conveyance mechanism 30 includes a pickup roller 31, nip rollers 32a to 32e and guides 33a to 33d. The pickup roller 31 feeds the sheet P, which is stacked in the sheet tray 20, one by one from the upper. The nip rollers 32a to 32e are arranged along the conveyance path and apply a conveying force to the sheet P. The guides 33a to 33d are respectively arranged between the pickup roller 31 and the nip rollers 32a to 32e on the conveyance path and guide the sheet P until the sheet P applied with the conveying force by the nip rollers 32a to 32e reach the next nip rollers 32a to 32e. When the sheet P conveyed by the conveyance mechanism 30 passes through a printing area (a recording area) between the inkjet head 2 and the platen 9, an image is printed thereon by ink droplets discharged from the nozzles of the inkjet head 2. The sheet P on which the image is printed is further conveyed by the conveyance mechanism 30 and is then placed on the placement unit 15.

A sheet sensor 18 is arranged at a just downstream side of the nip roller 32b on the conveyance path. When a downstream-side end portion of the sheet P in the conveyance direction, which is being conveyed by the conveyance mechanism, passes below the sheet sensor 18, an output signal of the sheet sensor 18 is changed. By the change timing, the discharge timing of the ink droplets, which are discharged from the nozzles of the inkjet head 2, is determined.

A scanner unit 40 is mounted on the upper face of the upper housing 11 so that it covers a part of the placement unit 15. The scanner unit 40 has a scanner main body 41 and a feeder 42 that is arranged on an upper face of the scanner main body 41. An upper face of the feeder 42 is formed with a sheet feeding tray 43. A document (sheet) set on the sheet feeding tray 43 is moved in the right direction of FIG. 1 by the feeder 42, changes an advancing direction thereof by 180 degrees at the right-side end while an upper face thereof serves as an outer periphery and thus reverses the inside and outside thereof, and then the document passes through the upper face (a reading unit: not shown) of the scanner main body 41 and is then discharged from the left side of FIG. 1 and placed on the sheet discharge tray 44. When the sheet passes through the reading unit of the scanner main body 41, the scanner main body 41 reads the image formed on the face of the sheet and generates image data. In this way, when a plurality of documents is set with being stacked on the sheet feeding tray 43, the plurality of documents can be continuously read.

The upper face of the scanner main body 41 is formed with a reading face (not shown) on which the document can be directly placed. When the feeder 42 is upwardly rotated about a shaft 45, the reading face (a flat bed) of the scanner main body 41 is exposed. When the document is directly set on the exposed reading face, it is possible to enable the scanner main body 41 to read the document one by one.

A sensor 47 that detects whether the document is set on the sheet feeding tray 43 and the reading face of the scanner main body 41 is arranged. When the document is set on any one of the sheet feeding tray 43 and the reading face of the scanner main body 41, the scanner unit 40 outputs an ON signal to the control device 1p (which will be described later), and when the document is not set, the scanner unit outputs an OFF signal to the control device.

Figure 2:
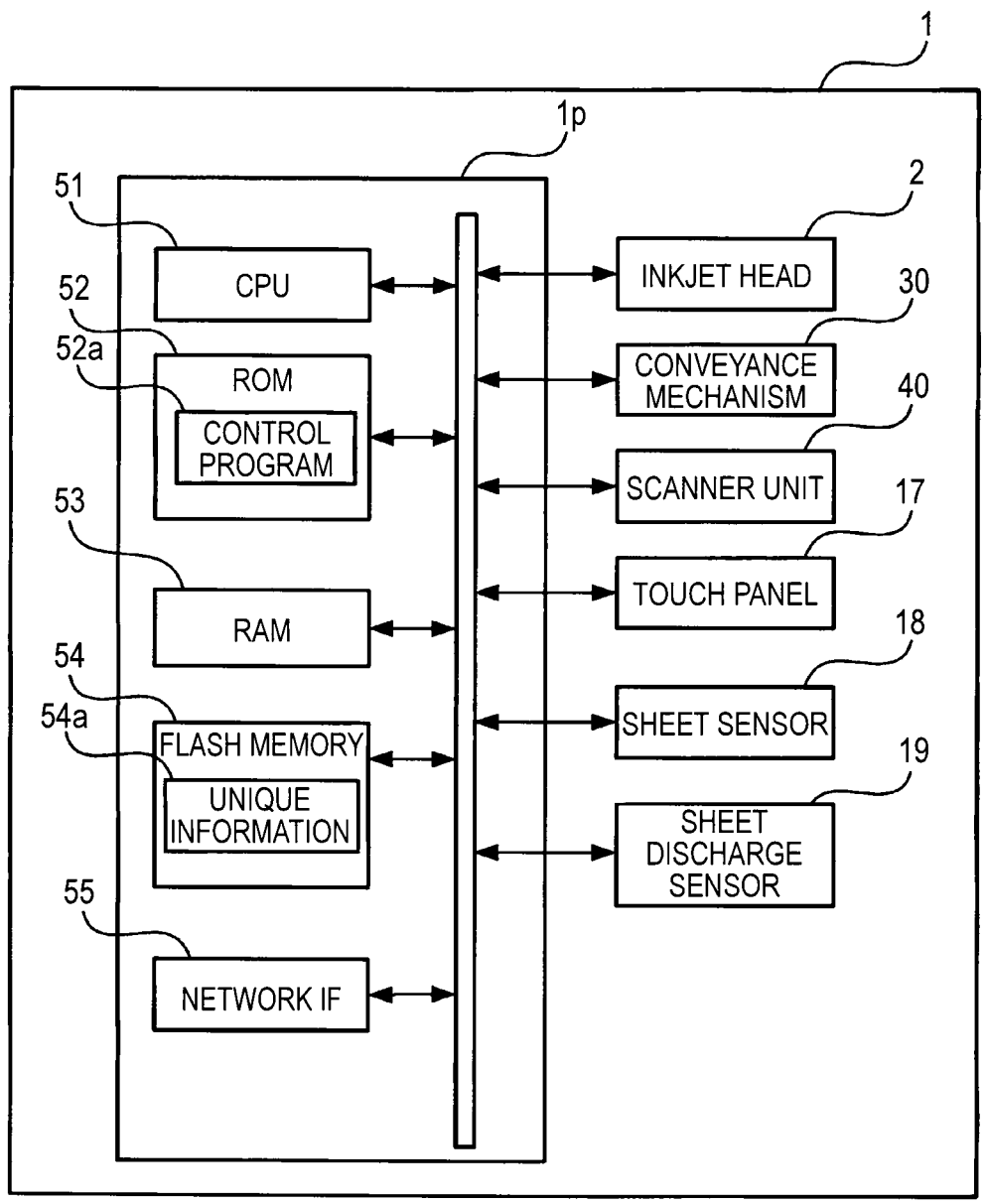
FIG. 2 is a functional block diagram of the MFP shown in FIG. 1.

The MFP 1 has the control device 1p. As shown in FIG. 2, the control device 1p has a CPU 51, a ROM 52, a RAM 53, a flash memory 54 and a network interface 55. Also, the control device 1p is electrically connected to the inkjet head 2, the conveyance mechanism 30, the scanner unit 40, a touch panel 17, the sheet sensor 18 and the sheet discharge sensor 19.

The touch panel 17 is a user interface having input and display functions and displays an operating status and receives an input operation of a user.

The ROM 32 stores therein firmware, which is a control program 52a for controlling the MFP 1, a variety of settings, initial values and the like. The RAM 53 and the flash memory 54 are used as work areas from which a variety of control programs are read out or storage areas that temporarily store therein data. Furthermore, the flash memory 54 stores therein an IP (Internet Protocol) address as unique information of the MFP 1, and the like.

The CPU 51 stores a processing result in the RAM 53 or flash memory 54 and controls the respective constitutional elements of the MFP 1, in accordance with the control program 52a read out from the ROM 52 and signals transmitted from the various sensors.

The network interface 55 transmits and receives data to and from a variety of apparatuses that are connected to the same LAN (Local Area Network) as the MFP 1. The data may be transmitted and received in a wireless or wired manner.

When the control program 52a is executed, the MFP 1 can execute a variety of processing, in accordance with commands received from the touch panel 17 or a PC (Personal Computer) through the LAN (network interface 55). The processing includes scanning, printing, copy and monitoring processing. When the scanning processing is executed, the document set on the scanner unit 40 is read by the scanner unit 40 and image data relating to an image formed on the document is generated. The generated image data is stored in a storage device of the MFP 1 or transmitted to a transmission source of the command or a user-designated destination through the LAN. When the printing processing is executed, an image relating to the image data, which is received together with the command, is printed on the sheet by the printing mechanism 10. When the copy processing is executed, the printing processing is further executed for the image data generated by the scanning processing. Thereby, the image of the document is copied on the sheet. While the monitoring processing is being executed, it is monitored whether there is a possibility that the sheet, which is placed on the placement unit 15 after the printing processing is executed, will be irregularly set on the scanner unit 40 and the scanning processing will be thus executed therefor.

Figure 3:
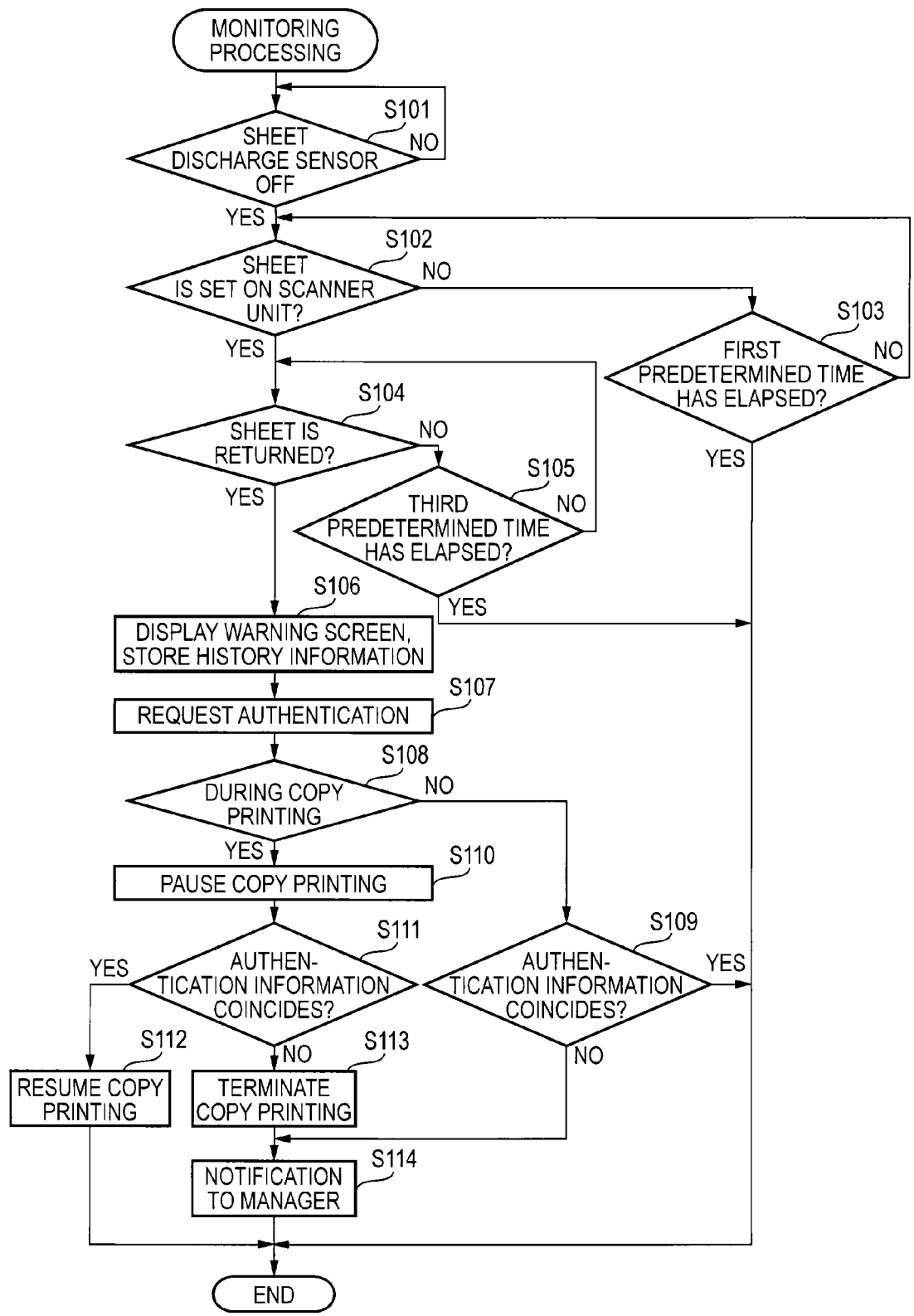
FIG. 3 is a flowchart showing an operating sequence of monitoring processing that is executed by a control program shown in FIG. 2.

An operating sequence of the monitoring processing is specifically described, with reference to FIG. 3. As shown in FIG. 3, when the monitoring processing starts, the CPU 51 determines whether the output of the sheet discharge sensor 19 is changed from ON to OFF, i.e., whether the printed sheet, which is placed on the placement unit 15 after the printing processing is executed, is taken out from the placement unit 15 (S101). When it is determined that the output of the sheet discharge sensor 19 is not changed from ON to OFF (S101: NO), the CPU 51 stands by until the output of the sheet discharge sensor 19 is changed to OFF.

When it is determined that the output of the sheet discharge sensor 19 is changed to OFF (S101: YES), the CPU 51 determines whether the sheet (document) is set on the scanner unit 40, i.e., the scanner processing is operated to start with following the printing processing, based on the signal output from the scanner unit 40 (S102). When it is determined that the sheet is not set on the scanner unit 40 (S102: NO), the CPU 51 determines whether a predetermined time (a first predetermined time: one minute, in this illustrative embodiment) has elapsed after the output of the sheet discharge sensor 19 is changed from ON to OFF (S103). When it is determined that the predetermined time has not elapsed (S103: NO), the CPU 51 repeatedly determines whether the sheet is set on the scanner unit 40 (S102). When it is determined that the predetermined time has elapsed (S103: YES), the CPU 51 determines that irregularity scanning processing has not been executed and ends the flowchart of FIG. 3.

When it is determined that the sheet is set on the scanner unit 40 (S102: YES), the CPU 51 determines whether the sheet is returned to the placement unit 15 (S104). In this way, when the scanner processing is operated to start before the predetermined time has elapsed, following the previous printing processing, the processing of monitoring whether the sheet is returned to the placement unit 15 is operated to start (start of the monitoring processing). In the meantime, when the sheet conveyance (which also may be a sheet conveyance that is included in the printing processing but does not accompany a printing) is executed and the sheet is thus discharged onto the placement unit 15, the output of the sheet discharge sensor 19 becomes ON within a predetermined time after the output of the sheet sensor 18 is changed from OFF to ON. On the other hand, when the sheet is returned to the placement unit 15, the output of the sheet sensor 18 is OFF and is not changed and the output of the sheet discharge sensor 19 becomes ON. Like this, the CPU 51 can determine whether the sheet is returned to the placement unit 15, based on the change timings of the outputs of the sheet sensor 18 and the sheet discharge sensor 19. As a modified embodiment, it may be possible to determine whether the sheet is returned to the placement unit 15 by using an operating history information of the nip roller 32*e*.

When it is determined that the sheet is not returned to the placement unit 15 (S104: NO), the CPU 51 determines whether a predetermined time (a third predetermined time: one minute, in this illustrative embodiment) has elapsed after it is determined that the sheet is set on the scanner unit 40 (S105). When it is determined that the predetermined time has not elapsed (S105: NO), the CPU 51 repeatedly determines whether the sheet is returned to the placement unit 15 (S104). When it is determined that the predetermined time has elapsed (S105: YES), the CPU 51 determines that the irregularity scanning processing is not performed and ends the flowchart of FIG. 3.

When it is determined that the sheet is returned to the placement unit 15 (S104: YES), the CPU 51 displays a warning screen, which warns that there is a possibility that the irregularity scanning processing has been executed, on the touch panel 17 and stores a history information, which includes data indicating an irregularity reading, in the flash memory 54 (S106). Also, the CPU 51 displays an authentication request screen, which requests (urges) an input of authentication information relating to a user of the issuance source of the command instructing the execution of the previous printing processing, on the touch panel 17 (S107).

The CPU 51 determines whether the printing processing is currently being executed in the copy processing (S108). That is, the CPU determines whether the scanner processing, which is operated to start before the predetermined time has elapsed after the output of the sheet discharge sensor 19 is changed from ON to OFF, is based on the copy processing. When it is determined that the printing processing is not currently executed in the copy processing, i.e., that only the scanner processing is executed (S108: NO), the CPU 51 determines whether the authentication information, which is input by the user in accordance with the authentication screen displayed on the touch panel 17, coincides with preset authentication information (S109). The preset authentication information may be stored in the flash memory 54 or other storage unit or may be received from another apparatus such as a management server through the LAN to which the MFP 1 is connected. Also, when the authentication information is not input within a predetermined time (a second predetermined time) after the authentication screen is displayed on the touch panel 17, the CPU 51 determines that the authentication information input by the user does not coincide with the preset authentication information. When it is determined that the authentication information does not coincide (S109: NO), the CPU 51 notifies an external apparatus (a server, a management PC and the like), which is used by a manager, that there is a high possibility that the irregularity scanning processing has been executed, through the LAN (the network interface 55) (S114) and ends the flowchart of FIG. 3. When it is determined that that the authentication information coincides (S109: YES), the CPU 51 determines that the irregularity scanning processing has not been executed and ends the flowchart of FIG. 3.

When it is determined that the printing processing is being executed in the copy processing (S108: YES), the CPU 51 pauses the printing processing that is being executed (S110). The CPU 51 determines whether the authentication information, which is input by the user in accordance with the authentication screen displayed on the touch panel 17, coincides with the preset authentication information (S111). When it is determined that the authentication information coincides (S111: YES), the CPU 51 determines that the irregularity scanning processing has not been executed, resumes the paused printing processing (S112) and ends the flowchart of FIG. 3. When it is determined that the authentication information does not coincide (S111: NO), the CPU 51 terminates the paused printing processing (S113). Then, the CPU 51 notifies the manager that there is a high possibility that the irregularity scanning processing has been executed, through the LAN (S114) and ends the flowchart of FIG. 3.

As specifically described above, according to the MFP 1 of this illustrative embodiment, when the scanner processing is operated to start before the first predetermined time has elapsed, following the previous printing processing, the processing of monitoring whether the sheet is returned to the placement unit 15 is executed. When it is determined during the monitoring that the sheet is returned to the placement unit 15, there is a high possibility that the image printed on the sheet has been read by the scanner processing. Therefore, it is possible that the screen indicating there is a high possibility that the irregularity scanner processing has been executed is displayed on the touch panel 17, the history information is stored, the processing is notified to the manager or the printing processing relating to the copy processing is paused when the copy processing is further being executed. According to these processing, it is possible to suppress the leakage of the information printed on the sheet.

Even though it is determined that there is a high possibility that the irregularity scanner processing has been executed and the printing processing relating to the copy processing is thus paused, when it is confirmed by the authentication information that the irregularity scanning processing has not been executed, the paused printing processing is resumed. Therefore, it is possible to securely execute the processing that the user desires.

Also, when it is determined that there is a high possibility that the irregularity scanner processing has been executed and the printing processing relating to the copy processing is thus paused, if the authentication information cannot be confirmed, the printing processing is terminated. Therefore, it is possible to further suppress the leakage of the information printed on the sheet.

Modified Embodiments

Figure 4:
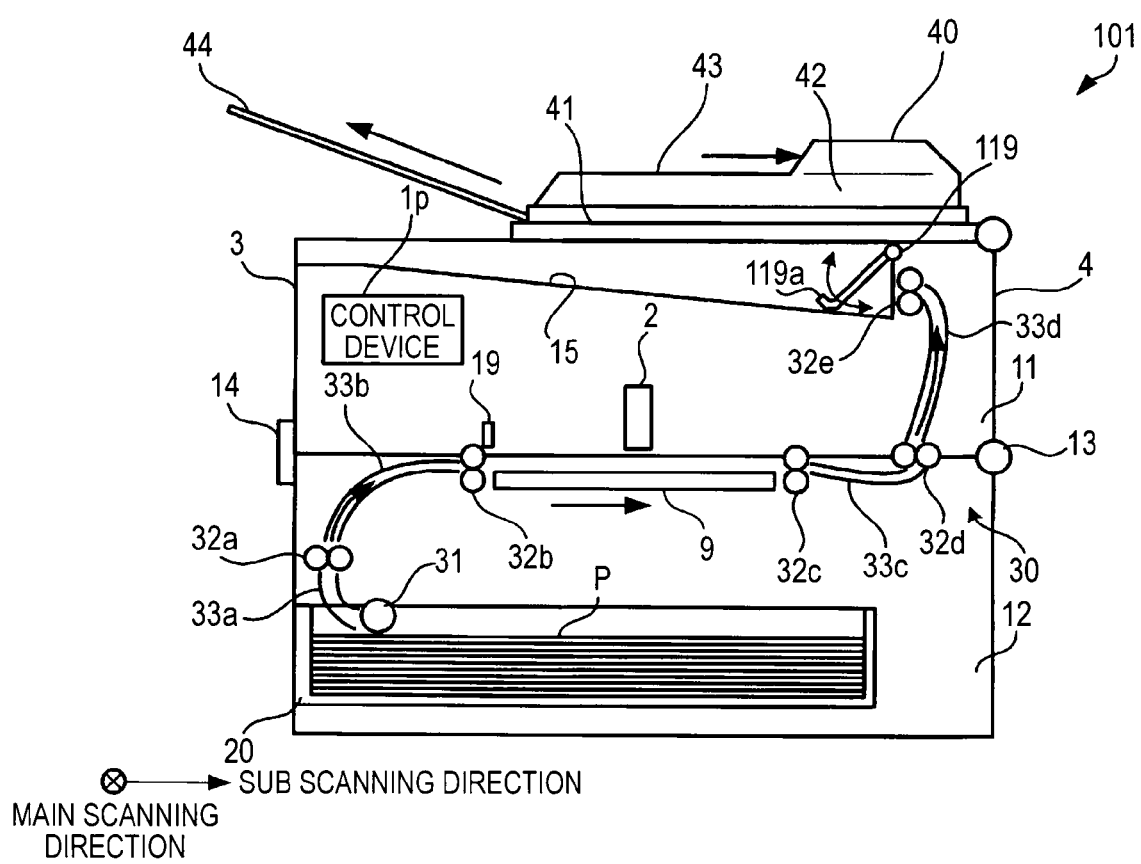
FIG. 4 illustrates a modified embodiment.

In the above illustrative embodiment, the sheet discharge sensor 19 outputs the signal, based on whether the sheet is placed on the placement unit 15. However, the sheet discharge sensor may be configured to output a signal corresponding to a number of sheets (an amount of placed sheets). For example, as shown in FIG. 4, a sheet discharge sensor 119 has a rotatable arm 119*a* and a free end of the arm 119*a* is configured to always abut on the uppermost face of the sheets placed on the placement unit 15. When the amount of sheets placed on the placement unit 15 is increased or decreased, a rotating position of the arm 119*a* is changed. The sheet discharge sensor 119 acquires the rotating position of the arm 119*a* by an encoder and the like and outputs. The CPU 51 can detect the amount of sheets placed on the placement unit 15, based on the output.

In the above illustrative embodiment, it is determined whether the printed sheet, which is placed on the placement unit 15 after the printing processing is executed, is taken out from the placement unit 15, based on whether the output of the sheet discharge sensor 19 is changed from ON to OFF (refer to S101 of FIG. 3). Also, it is determined whether the sheet is returned to the placement unit 15, based on whether the output of the sheet discharge sensor 19 becomes ON while the output of the sheet sensor 18 is OFF and is not changed (refer to S104 of FIG. 3). In contrast, in a modified embodiment, it is determined whether the printed sheet, which is placed on the placement unit 15 after the printing processing is executed, is taken out from the placement unit 15, based on whether the amount of placed sheets, which is detected from the output of the sheet discharge sensor 119, is decreased or not. Also, it is determined whether the sheet is returned to the placement unit 15, based on whether the amount of placed sheets, which is detected from the output of the sheet discharge sensor 119, is increased or not while the output of the sheet sensor 18 is OFF and is not changed.

According to this modified embodiment, even when only a part of the information printed on the sheet is scanned, such issue can be detected and thus suppressed.

In the meantime, the illustrative embodiment is just exemplary and does not limit this disclosure. Therefore, this disclosure can be variously improved and modified without departing from the scope of this disclosure. For example, in the above illustrative embodiment, when it is determined during the monitoring that the sheet is returned to the placement unit 15, the screen indicating that there is a high possibility that the irregularity scanner processing has been executed is displayed on the touch panel 17, the history information is stored or such issue is notified to the manager. However, any configuration is possible as long as at least the history information is stored. Furthermore, the screen indicating that there is a high possibility that the irregularity scanner processing has been executed may not be displayed on the touch panel 17, the history information may not stored or such issue may not notified to the manager insofar as the printing processing relating to the copy processing is paused.

Also, in the above illustrative embodiment, when it is determined that there is a high possibility that the irregularity scanner processing has been executed, the printing processing relating to the copy processing is paused. However, the printing processing may not be paused.

Furthermore, in the above illustrative embodiment, even though it is determined that there is a high possibility that the irregularity scanner processing has been executed and the printing processing relating to the copy processing is thus paused, when it is confirmed by the authentication information that the irregularity scanning processing has not been executed, the paused printing processing is resumed. However, when it is determined that there is a high possibility that the irregularity scanner processing has been executed, the printing processing relating to the copy processing may be terminated.

Furthermore, when it is determined that there is a high possibility that the irregularity scanner processing has been executed and thus the printing processing relating to the copy processing is paused, if the authentication information cannot be confirmed, the printing processing is terminated. However, the authentication information may not be input.

In the above illustrative embodiment, the MFP 1 has the inkjet-type printing mechanism. However, the printing method is not particularly limited inasmuch as an image can be printed on the sheet passing through the printing area. For example, the MFP may have a laser-type printing mechanism.

Also, the example where this disclosure is applied to the MFP has been described. However, this disclosure can be applied to all apparatuses capable of executing the scanning processing and the printing processing, for example, a facsimile.

What is claimed is:
1. An image recording apparatus comprising:
a reading unit configured to read an image formed on a recording medium;
a recording unit configured to record an image on the recording medium positioned in a recording area;
a placement unit, on which the recording medium having the image recorded by the recording unit is placed;
a conveyance mechanism configured to convey the recording medium to the placement unit via the recording area;
a sensor configured to output a signal, based on whether the recording medium on the placement unit is detected;
a storage unit; and a controller configured to control the reading unit, the recording unit, the conveyance mechanism, the sensor and the storage unit, wherein the controller is configured to:

determine, when the signal received from the sensor is changed from a signal indicating that the recording medium is not detected to a signal indicating that the recording medium is detected, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism;

start, when the reading unit is operated to start reading the image within a first predetermined time after the signal received from the sensor is changed from the signal indicating that the recording medium is detected to the signal indicating that the recording medium is not detected, monitoring to determine whether the recording medium is placed on the placement unit without conveying by the conveyance mechanism; and store, when it is determined during the monitoring that the recording medium is placed on the placement unit without conveying by the conveyance mechanism, data indicating an irregularity reading in the storage unit.

2. The image recording apparatus according to claim 1, wherein the sensor is configured to output a signal relating to an amount of the recording medium placed on the placement unit, wherein the controller is configured to:

determine, when the signal received from the sensor is changed in correspondence to an increase in the amount, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism; and start, when the reading unit is operated to start reading the image within the first predetermined time after the signal received from the sensor is changed in correspondence to a decrease in the amount, monitoring to determine whether the recording medium is placed on the placement unit without conveying by the conveyance mechanism; and store, when it is determined during the monitoring that the recording medium is placed on the placement unit without conveying by the conveyance mechanism, data indicating an irregularity reading in the storage unit.

3. The image recording apparatus according to claim 1, wherein the controller ends the monitoring after the image reading by the reading unit is completed until a third predetermined time elapses.

4. An image recording apparatus comprising:

a reading unit configured to read an image formed on a recording medium;

a recording unit configured to record an image on the recording medium positioned in a recording area;

a placement unit on which the recording medium having the image recorded thereon by the recording unit is placed;

a conveyance mechanism that conveys the recording medium to the placement unit via the recording area;

a sensor configured to output a signal, based on whether the recording medium on the placement unit is detected; and a controller configured to control the reading unit, the recording unit, the conveyance mechanism and the sensor, wherein the controller is configured to:

determine, when the signal received from the sensor is changed from a signal indicating that the recording medium is not detected to a signal indicating that the recording medium is detected, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism;

start, when an image reading by the reading unit and an image recording by the recording unit are controlled within a first predetermined time after the signal received from the sensor is changed from the signal indicating that the recording medium is detected to the signal indicating that the recording medium is not detected, monitoring to determine whether the recording medium is placed on the placement unit without conveying by the conveyance mechanism; and stop, when it is determined during the monitoring that the recording medium is placed on the placement unit without conveying by the conveyance mechanism, the operation of the recording unit to record the image read by the reading unit.

5. The image recording apparatus according to claim 4, wherein the sensor is configured to output a signal relating to an amount of the recording medium placed on the placement unit, wherein the controller is configured to:

determine, when the signal received from the sensor is changed in correspondence to an increase in the amount, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism;

start, when the reading unit is operated to start reading the image within the first predetermined time after the signal received from the sensor is changed in correspondence to a decrease in the amount, monitoring whether the recording medium is placed on the placement unit without conveying by the conveyance mechanism; and stop, when it is determined during the monitoring that the recording medium is placed on the placement unit without conveying by the conveyance mechanism, the operation of the recording unit to record the image read by the reading unit.

6. The image recording apparatus according to claim 4, further comprising a display unit; and an input unit to which information relating to a user operation is input, wherein when the operation of the recording unit is stopped, the controller displays a screen, which urges to input authentication information, on the display unit, and wherein when it is determined that the information received from the input unit is preset authentication information, the controller resumes the operation of the recording unit.

7. The image recording apparatus according to claim 6, wherein when the information received from the input unit is not the authentication information or when the information relating to a user operation is not received from the input unit within a second predetermined time after the screen, which urges to input the authentication information, is displayed on the display unit, the controller stops the operation of the recording unit to record the read image.

8. The image recording apparatus according to claim 6, further comprising
a communication unit that performs data communication with an external apparatus, which is a management apparatus managing the image recording apparatus or a recording instruction apparatus instructing the image recording apparatus on a recording,
wherein when the information received from the input unit is not the authentication information or when the information relating to a user operation is not received from the input unit within a second predetermined time after the screen, which urges a user to input the authentication information, is displayed on the display unit, the controller notifies the external apparatus that an irregularity reading has been executed, through the communication unit.

9. A non-transitory computer-readable medium having instructions to control an image recording apparatus comprising a reading unit configured to read an image formed on a recording medium; a recording unit configured to record an image on the recording medium positioned in a recording area; a placement unit, on which the recording medium having the image recorded by the recording unit is placed; a conveyance mechanism configured to convey the recording medium to the placement unit via the recording area; a sensor configured to output a signal, based on whether the recording medium on the placement unit is detected; wherein the image recording apparatus is configured to determine, when the signal received from the sensor is changed from a signal indicating that the recording medium is not detected to a signal indicating that the recording medium is detected, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism, the instructions to control the image recording apparatus to perform a method comprising:
starting, when the reading unit is operated to start reading the image within a first predetermined time after the signal received from the sensor is changed from the signal indicating that the recording medium is detected to the signal indicating that the recording medium is not detected, monitoring to determine whether the recording medium is placed on the placement unit without conveying by the conveyance mechanism; and
storing, when it is determined during the monitoring that the recording medium is placed on the placement unit without conveying by the conveyance mechanism, data indicating an irregularity reading in the storage unit.

10. A non-transitory computer-readable medium having instructions to control an image recording apparatus comprising a reading unit configured to read an image formed on a recording medium; a recording unit configured to record an image on the recording medium positioned in a recording area; a placement unit, on which the recording medium having the image recorded by the recording unit is placed; a conveyance mechanism configured to convey the recording medium to the placement unit via the recording area; a sensor configured to output a signal, based on whether the recording medium on the placement unit is detected; a storage unit, wherein the image recording apparatus is configured to determine, when the signal received from the sensor is changed from a signal indicating that the recording medium is not detected to a signal indicating that the recording medium is detected, whether the change indicates a case where the recording medium is conveyed by the conveyance mechanism and is thus placed on the placement unit or a case where the recording medium is placed on the placement unit without conveying by the conveyance mechanism, based on whether the recording medium is conveyed by the conveyance mechanism, the instructions to control the image recording apparatus to perform a method comprising:
starting, when an image reading by the reading unit and an image recording by the recording unit are controlled within a first predetermined time after the signal received from the sensor is changed from the signal indicating that the recording medium is detected to the signal indicating that the recording medium is not detected, monitoring to determine whether the recording medium is placed on the placement unit without conveying by the conveyance mechanism, and
stopping, when it is determined during the monitoring that the recording medium is placed on the placement unit without conveying by the conveyance mechanism, the operation of the recording unit to record the image read by the reading unit.

* * * * *